US012726644B2

(12) United States Patent
Ding et al.

(10) Patent No.: US 12,726,644 B2
(45) Date of Patent: Sep. 1, 2026

(54) EFFICIENT NEURAL NETWORK MODULE FOR IMAGE COMPRESSION

(71) Applicant: Tencent America LLC, Palo Alto, CA (US)

(72) Inventors: Ding Ding, Washington, DC (US); Xiaozhong Xu, State College, PA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 418 days.

(21) Appl. No.: 18/455,968

(22) Filed: Aug. 25, 2023

(65) Prior Publication Data

US 2024/0236346 A1 Jul. 11, 2024

Related U.S. Application Data

(60) Provisional application No. 63/438,493, filed on Jan. 11, 2023.

(51) Int. Cl.

*H04N 19/103* (2014.01)
*H04N 19/132* (2014.01)
*H04N 19/436* (2014.01)
*H04N 19/61* (2014.01)

(52) U.S. Cl.

CPC ......... *H04N 19/436* (2014.11); *H04N 19/103* (2014.11); *H04N 19/132* (2014.11); *H04N 19/61* (2014.11)

(58) Field of Classification Search

CPC .. H04N 19/436; H04N 19/103; H04N 19/132; H04N 19/61; G06N 3/045; G06T 9/002

USPC ........................................................ 382/156

See application file for complete search history.

(56) References Cited

U.S. PATENT DOCUMENTS

2021/0279880 A1* 9/2021 Giner .................... G06T 7/0012
2024/0296594 A1* 9/2024 Solovyev ................ G06T 9/002

FOREIGN PATENT DOCUMENTS

CN 113660486 A 11/2021

OTHER PUBLICATIONS

Ma, Siwei, et al. "Image and Video Compression With Neural Networks: A Review." IEEE Transactions on Circuits and Systems for Video Technology, vol. 30, No. 6, Jun. 2020, pp. 1683-1698. Crossref, https://doi.org/10.1109/tcsvt.2019.2910119. (Year: 2019).*

(Continued)

*Primary Examiner* — Jennifer Mehmood
*Assistant Examiner* — Dustin Bilodeau
(74) *Attorney, Agent, or Firm* — Sughrue Mion, PLLC

(57) ABSTRACT

Methods and apparatuses for neural network based image compression may be provided. The method may include receiving a compressed input image; generating a first prediction of the input image using a first combination of one or more first convolutional nets, a first activation function, and the compressed input image, the generating includes at least: upsampling an output image from the one or more first convolutional nets; and performing tensor transform based on the upsampled output image; and decoding the compressed input image using the generated first prediction.

20 Claims, 9 Drawing Sheets

(56) References Cited

OTHER PUBLICATIONS

Siwei Ma et al., "Image and Video Compression with Neural Networks: A Review," IEEE Transactions on Circuits and Systems for Video Technology, Apr. 10, 2019; pp. 1-16 (16 pages total), URL: https://arxiv.org/pdf/1904.03567>.
International Search Report issued Nov. 20, 2023 in Application No. PCT/US23/31243.
Written Opinion issued Nov. 20, 2023 in Application No. PCT/US23/31243.
European Search Report issued Apr. 23, 2026 in EP Application No. 23904793.9.
Zhou Lei et al: "End-to-end Optimized Image Compression with Attention Mechanism", CVPR Workshop, Jun. 16, 2019 (Jun. 16, 2019), pp. 1-4, XP055935812.

* cited by examiner

Main Decoder 320

Main Encoder 310

450

EFFICIENT NEURAL NETWORK MODULE FOR IMAGE COMPRESSION

CROSS-REFERENCE TO RELATED APPLICATION

This application is based on and claims priority to U.S. Provisional Patent Application No. 63/438,493, filed on Jan. 11, 2023, the disclosure of which is incorporated by reference herein in its entirety.

BACKGROUND

A traditional hybrid video codec is difficult to be optimized as a whole. An improvement of a single module may not result in a coding gain in overall performance. Recently, Standard groups and companies have been actively searching for potential needs for standardization of future video coding technology. These standard groups and companies have established JPEG-AI group focusing on AI-based end-to-end neural image compression using Deep Neural Networks (DNN). The Chinese AVS standard has also formed AVS-AI special group to work on neural image and video compression technologies. The success of recent approaches has brought more and more industrial interests in advanced neural image and video compression methodologies.

Specifically, architectures that can provide reasonable compression performance while substantially reducing the complexity of image compression models are needed.

SUMMARY

According to embodiments, methods and apparatuses are provided for implementing long-range context models in neural image compression. The embodiments disclosed herein may be applied to both encoding and decoding processes in neural image compression.

According to an aspect of the disclosure, a method for decoding using neural network based image compression, the method being executed by at least one processor is provided. The method may include receiving a compressed input image; generating a first prediction of the compressed input image using a first combination of one or more first convolutional nets, a first activation function, and the compressed input image, the generating the first prediction may include: upsampling a first output from the one or more first convolutional nets; and performing tensor transform based on the upsampled first output; and decoding the compressed input image using the generated first prediction.

According to an aspect of the disclosure, an apparatus for decoding neural network based image compression may be provided. The apparatus may include at least one memory configured to store computer program code; and at least one processor configured to read the computer program code and operate as instructed by the computer program code. The program code may include receiving code configured to cause the at least one processor to receive a compressed input image; first generating code configured to cause the at least one processor to generate a first prediction of the compressed input image using a first combination of one or more first convolutional nets, a first activation function, and the compressed input image, the first generating code includes first upsampling code configured to cause the at least one processor to upsample a first output from the one or more first convolutional nets; and first tensor transform code configured to cause the at least one processor to perform tensor transform based on the upsampled first output; and first decoding code configured to cause the at least one processor to decode the compressed input image using the generated first prediction.

According to an aspect of the disclosure, a non-transitory computer-readable medium storing instructions that are executed by at least one processor, may be provided that may cause the at least one processor to receive a compressed input image; generate a first prediction of the compressed input image using a first combination of one or more first convolutional nets, a first activation function, and the compressed input image, the generating the first prediction may include: upsampling a first output from the one or more first convolutional nets; and performing tensor transform based on the upsampled first output; and decode the compressed input image using the generated first prediction.

According to an aspect of the disclosure, a method for encoding using neural network based image compression, the method being executed by at least one processor is provided. The method may include receiving an input image; generating a first prediction of the input using a first combination of one or more first convolutional nets, a first activation function, and the input image, the generating the first prediction includes downsampling a first output from the one or more first convolutional nets; and performing tensor transform based on the downsampled first output; and encoding the input image using the generated first prediction.

According to an aspect of the disclosure, an apparatus for encoding neural network based image compression may be provided. The apparatus may include at least one memory configured to store computer program code; and at least one processor configured to read the computer program code and operate as instructed by the computer program code. The program code may include code configured to receive an input image; generate a first prediction of the input using a first combination of one or more first convolutional nets, a first activation function, and the input image, the generating code may downsample a first output from the one or more first convolutional nets; and perform tensor transform based on the downsampled first output; and decode the input image using the generated first prediction.

According to an aspect of the disclosure, a non-transitory computer-readable medium storing instructions that are executed by at least one processor, may be provided that may cause the at least one processor to receive an input image; generate a first prediction of the input using a first combination of one or more first convolutional nets, a first activation function, and the input image, the generating code may downsample a first output from the one or more first convolutional nets; and perform tensor transform based on the downsampled first output; and decode the input image using the generated first prediction.

According to an aspect of the disclosure, a method for neural network based image compression may be provided. The method may be executed by at least one processor and may include receiving an input image; generating a first prediction using a first combination of one or more first convolutional nets, a first activation function, and the input image; generating a second prediction using a second combination of one or more second convolutional nets, a second activation function, and the first prediction; and multiplying the first prediction and the second prediction to generate a compressed image.

According to another aspect of the disclosure, an apparatus for neural network based image compression may be provided. The apparatus may include at least one memory configured to store computer program code; and at least one processor configured to read the computer program code and operate as instructed by the computer program code. The program code may include receiving code configured to cause the at least one processor to receive an input image; first generating code configured to cause the at least one processor to generate a first prediction using a first combination of one or more first convolutional nets, a first activation function, and the input image; second generating code configured to cause the at least one processor to generate a second prediction using a second combination of one or more second convolutional nets, a second activation function, and the first prediction; and first multiplying code configured to cause the at least one processor to multiply the first prediction and the second prediction to generate a compressed image.

According to another aspect of the disclosure, a non-transitory computer-readable medium storing instructions that are executed by at least one processor, may be provided that may cause the at least one processor to receive an input image; generate a first prediction using a first combination of one or more first convolutional nets, a first activation function, and the input image; generate a second prediction using a second combination of one or more second convolutional nets, a second activation function, and the first prediction; and multiply the first prediction and the second prediction to generate a compressed image.

Additional embodiments will be set forth in the description that follows and, in part, will be apparent from the description, and/or may be realized by practice of the presented embodiments of the disclosure.

DETAILED DESCRIPTION

Figure 1:
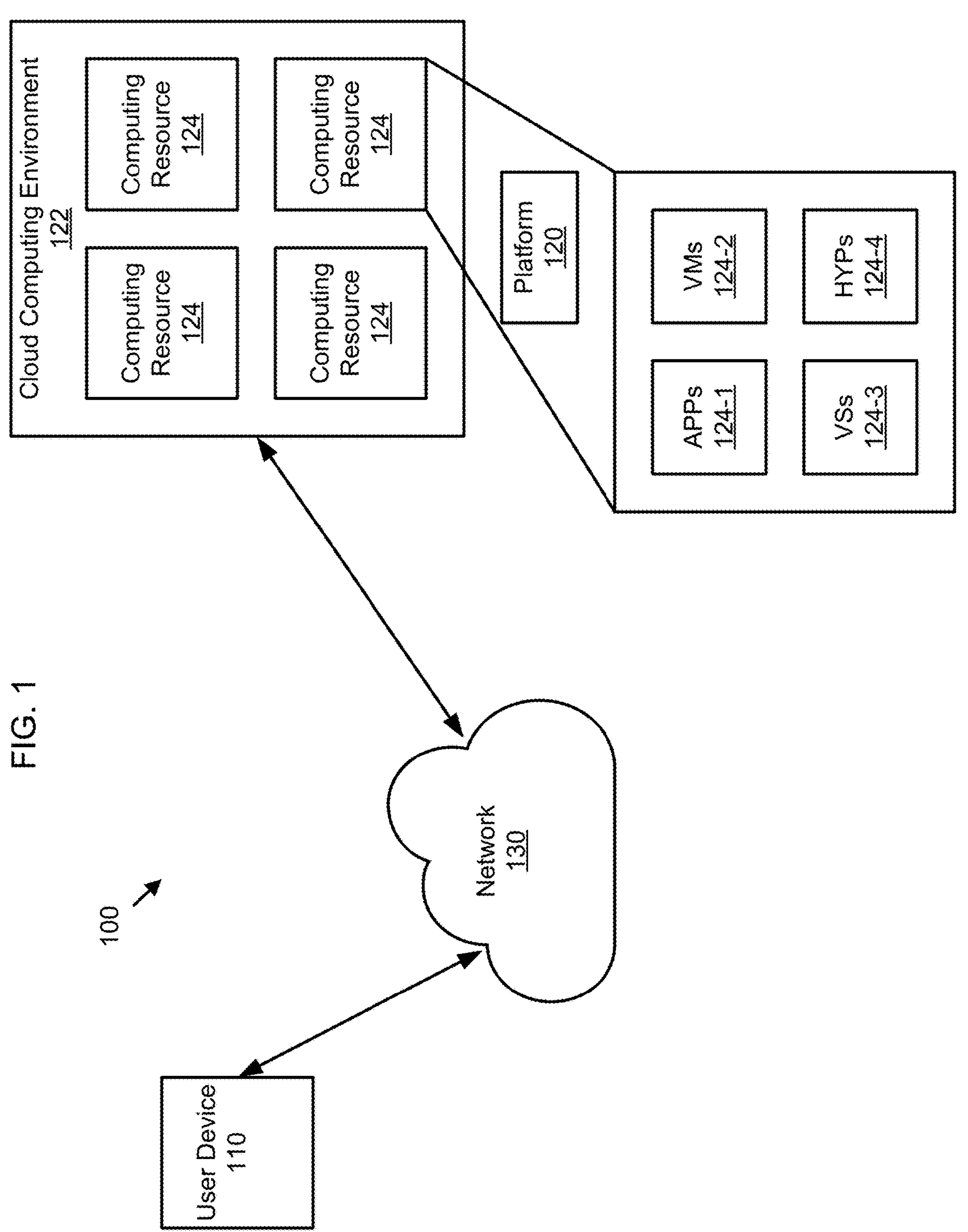
FIG. 1 is a diagram of an environment in which methods, apparatuses and systems described herein may be implemented, according to embodiments.

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, software, or a combination of hardware and software. The actual specialized control hardware or software code used to implement these systems and/or methods is not limiting of the implementations. Thus, the operation and behavior of the systems and/or methods were described herein without reference to specific software code. It is understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

The proposed features discussed below may be used separately or combined in any order. Further, the embodiments may be implemented by processing circuitry (e.g., one or more processors or one or more integrated circuits). In one example, the one or more processors execute a program that is stored in a non-transitory computer-readable medium.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Embodiments of the present disclosure relate to a Corner-to-Center transformer-based Context Model (C3M) or Edge-to-Center transformer-based Context Model designed to enhance context and latent predictions and improve rate-distortion performance.

A VAE-based framework (e.g., FIG. 3) utilizes a DNN-based transform as the main encoder to project the images to a low-dimensional latent space. Following quantization, the entropy estimation model predicts the distributions of latents, which are subsequently compressed into a bit stream using an arithmetic encoder aided by the estimated distribution. At the decoding end, the same entropy estimation model is applied to the arithmetic decoder to recover the latency information. This information is then fed into a DNN-based main decoder to reconstruct the original image.

FIG. 1 is a diagram of an environment 100 in which methods, apparatuses and systems described herein may be implemented, according to embodiments.

As shown in FIG. 1, the environment 100 may include a user device 110, a platform 120, and a network 130. Devices of the environment 100 may interconnect via wired connections, wireless connections, or a combination of wired and wireless connections.

The user device 110 includes one or more devices capable of receiving, generating, storing, processing, and/or providing information associated with platform 120. For example, the user device 110 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, the user device 110 may receive information from and/or transmit information to the platform 120.

The platform 120 includes one or more devices as described elsewhere herein. In some implementations, the platform 120 may include a cloud server or a group of cloud servers. In some implementations, the platform 120 may be designed to be modular such that software components may be swapped in or out. As such, the platform 120 may be easily and/or quickly reconfigured for different uses.

In some implementations, as shown, the platform 120 may be hosted in a cloud computing environment 122. Notably, while implementations described herein describe the platform 120 as being hosted in the cloud computing environment 122, in some implementations, the platform 120 may not be cloud-based (i.e., may be implemented outside of a cloud computing environment) or may be partially cloud-based.

The cloud computing environment 122 includes an environment that hosts the platform 120. The cloud computing environment 122 may provide computation, software, data access, storage, etc. services that do not require end-user (e.g., the user device 110) knowledge of a physical location and configuration of system(s) and/or device(s) that hosts the platform 120. As shown, the cloud computing environment 122 may include a group of computing resources 124 (referred to collectively as "computing resources 124" and individually as "computing resource 124").

The computing resource 124 includes one or more personal computers, workstation computers, server devices, or other types of computation and/or communication devices. In some implementations, the computing resource 124 may host the platform 120. The cloud resources may include compute instances executing in the computing resource 124, storage devices provided in the computing resource 124, data transfer devices provided by the computing resource 124, etc. In some implementations, the computing resource 124 may communicate with other computing resources 124 via wired connections, wireless connections, or a combination of wired and wireless connections.

As further shown in FIG. 1, the computing resource 124 includes a group of cloud resources, such as one or more applications ("APPs") 124-1, one or more virtual machines ("VMs") 124-2, virtualized storage ("VSs") 124-3, one or more hypervisors ("HYPs") 124-4, or the like.

The application 124-1 includes one or more software applications that may be provided to or accessed by the user device 110 and/or the platform 120. The application 124-1 may eliminate a need to install and execute the software applications on the user device 110. For example, the application 124-1 may include software associated with the platform 120 and/or any other software capable of being provided via the cloud computing environment 122. In some implementations, one application 124-1 may send/receive information to/from one or more other applications 124-1, via the virtual machine 124-2.

The virtual machine 124-2 includes a software implementation of a machine (e.g., a computer) that executes programs like a physical machine. The virtual machine 124-2 may be either a system virtual machine or a process virtual machine, depending upon use and degree of correspondence to any real machine by the virtual machine 124-2. A system virtual machine may provide a complete system platform that supports execution of a complete operating system ("OS"). A process virtual machine may execute a single program, and may support a single process. In some implementations, the virtual machine 124-2 may execute on behalf of a user (e.g., the user device 110), and may manage infrastructure of the cloud computing environment 122, such as data management, synchronization, or long-duration data transfers.

The virtualized storage 124-3 includes one or more storage systems and/or one or more devices that use virtualization techniques within the storage systems or devices of the computing resource 124. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

The hypervisor 124-4 may provide hardware virtualization techniques that allow multiple operating systems (e.g., "guest operating systems") to execute concurrently on a host computer, such as the computing resource 124. The hypervisor 124-4 may present a virtual operating platform to the guest operating systems, and may manage the execution of the guest operating systems. Multiple instances of a variety of operating systems may share virtualized hardware resources.

The network 130 includes one or more wired and/or wireless networks. For example, the network 130 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of the environment 100 may perform one or more functions described as being performed by another set of devices of the environment 100.

Figure 2:
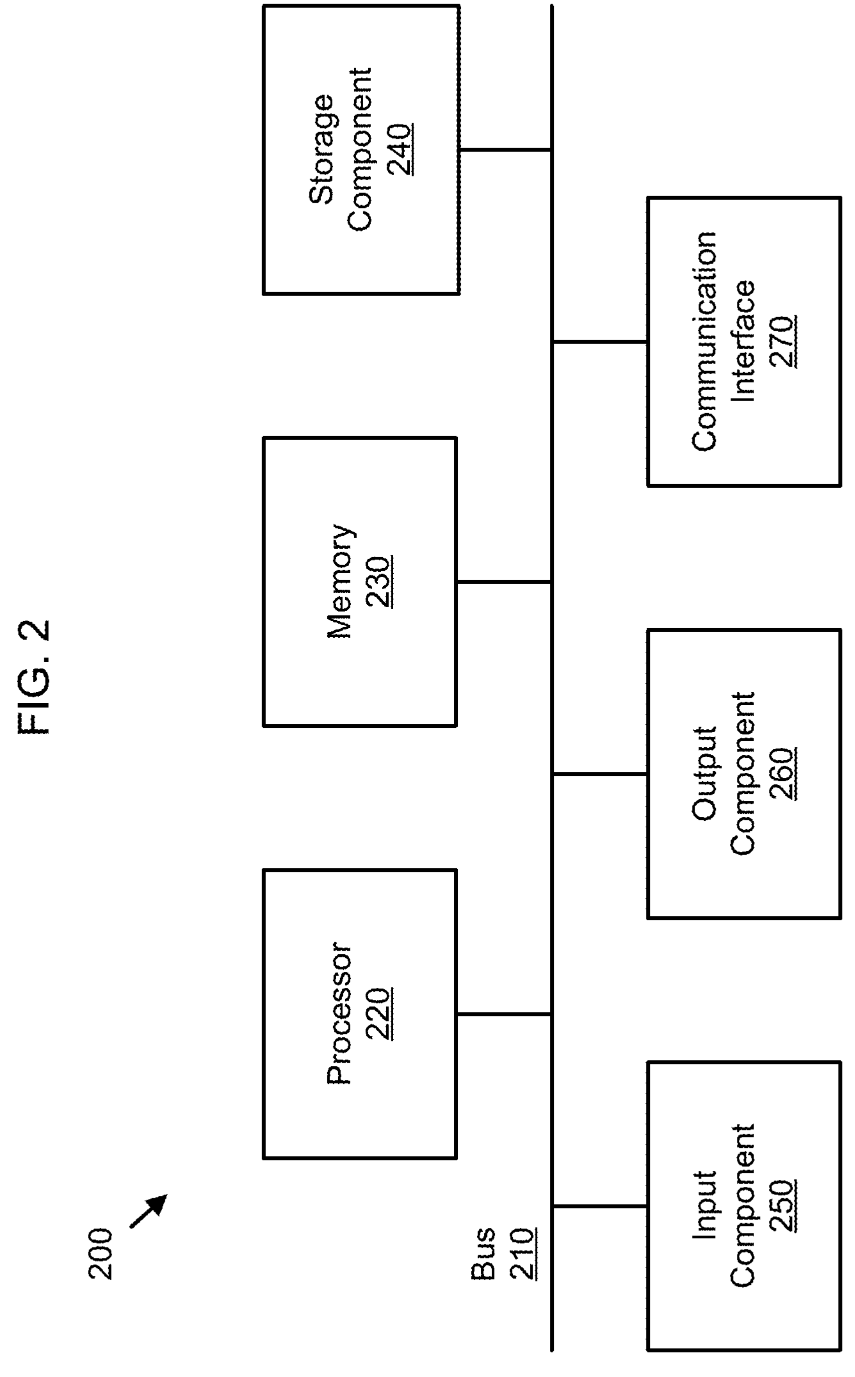
FIG. 2 is a block diagram of example components of one or more devices of FIG. 1.

FIG. 2 is a block diagram of example components of one or more devices of FIG. 1.

A device 200 may correspond to the user device 110 and/or the platform 120. As shown in FIG. 2, the device 200 may include a bus 210, a processor 220, a memory 230, a storage component 240, an input component 250, an output component 260, and a communication interface 270.

The bus 210 includes a component that permits communication among the components of the device 200. The processor 220 is implemented in hardware, software, or a combination of hardware and software. The processor 220 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, the processor 220 includes one or more processors capable of being programmed to perform a function. The memory 230 includes a random access memory (RAM), a read only memory (ROM), and/or another type of dynamic or static storage device (e.g., a flash memory, a magnetic memory, and/or an optical memory) that stores information and/or instructions for use by the processor 220.

The storage component 240 stores information and/or software related to the operation and use of the device 200. For example, the storage component 240 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input component 250 includes a component that permits the device 200 to receive information, such as via user input (e.g., a touch screen display, a keyboard, a keypad, a mouse, a button, a switch, and/or a microphone). Additionally, or alternatively, the input component 250 may include a sensor for sensing information (e.g., a global positioning system (GPS) component, an accelerometer, a gyroscope, and/or an actuator). The output component 260 includes a component that provides output information from the device 200 (e.g., a display, a speaker, and/or one or more light-emitting diodes (LEDs)).

The communication interface 270 includes a transceiver-like component (e.g., a transceiver and/or a separate receiver and transmitter) that enables the device 200 to communicate with other devices, such as via a wired connection, a wireless connection, or a combination of wired and wireless connections. The communication interface 270 may permit the device 200 to receive information from another device and/or provide information to another device. For example, the communication interface 270 may include an Ethernet interface, an optical interface, a coaxial interface, an infrared interface, a radio frequency (RF) interface, a universal serial bus (USB) interface, a Wi-Fi interface, a cellular network interface, or the like.

The device 200 may perform one or more processes described herein. The device 200 may perform these processes in response to the processor 220 executing software instructions stored by a non-transitory computer-readable medium, such as the memory 230 and/or the storage component 240. A computer-readable medium is defined herein as a non-transitory memory device. A memory device includes memory space within a single physical storage device or memory space spread across multiple physical storage devices.

Software instructions may be read into the memory 230 and/or the storage component 240 from another computer-readable medium or from another device via the communication interface 270. When executed, software instructions stored in the memory 230 and/or the storage component 240 may cause the processor 220 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 2 are provided as an example. In practice, the device 200 may include additional components, fewer components, different components, or differently arranged components than those shown in FIG. 2. Additionally, or alternatively, a set of components (e.g., one or more components) of the device 200 may perform one or more functions described as being performed by another set of components of the device 200.

Figure 3A:
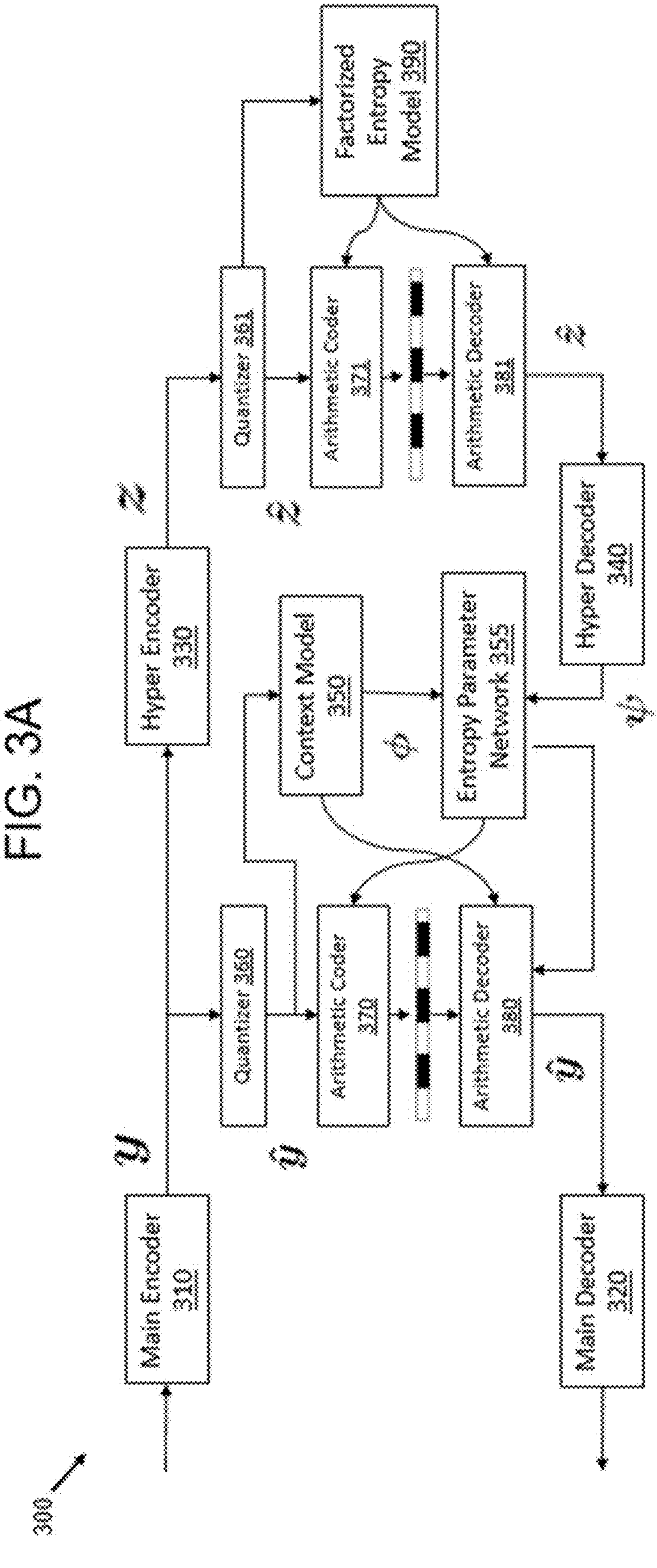
FIG. 3A illustrates an example of a framework of a variation autoencoder (VAE)-based neural image compression networks.
Figure 3C:
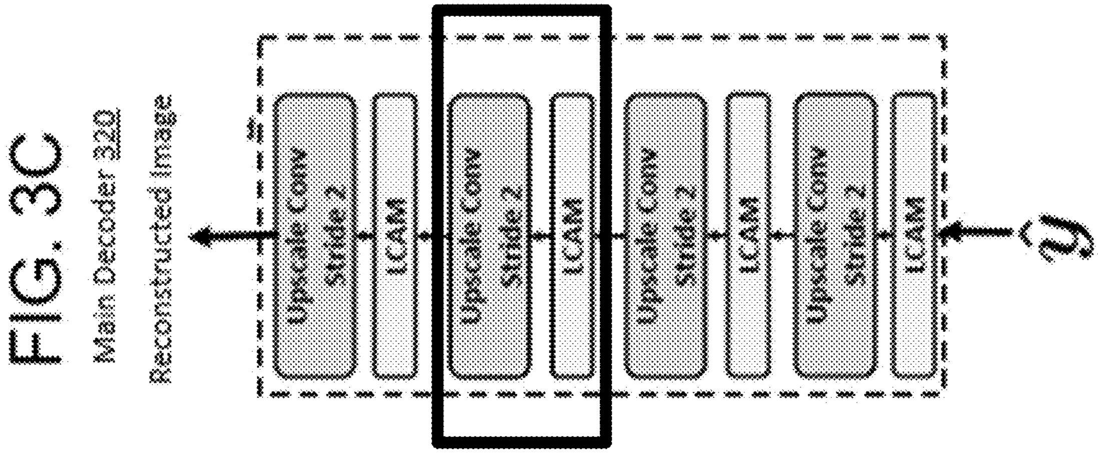
FIG. 3B-3C illustrates examples of encoder and decoder structures of one or more encoders or decoders of VAE-based neural image compression networks of FIG. 3A.
Figure 3B:
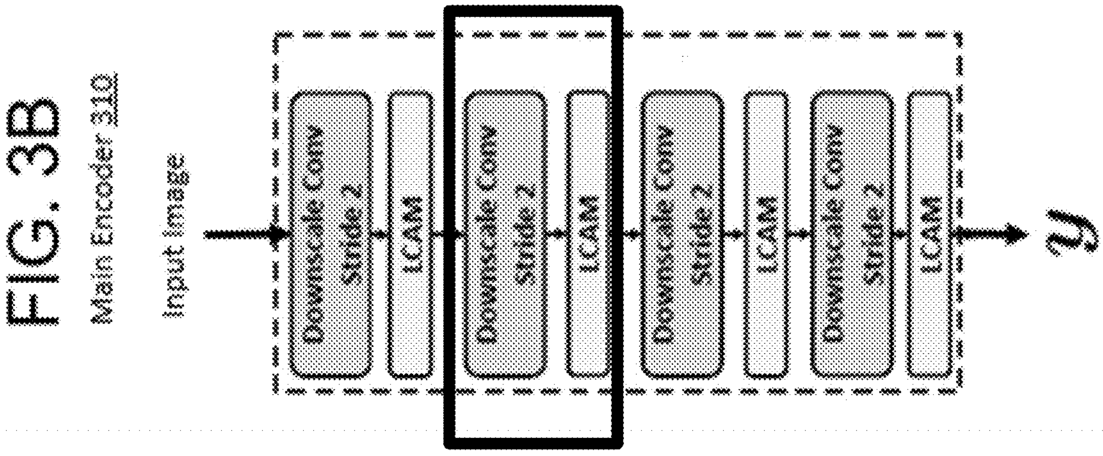
Figure 3D:
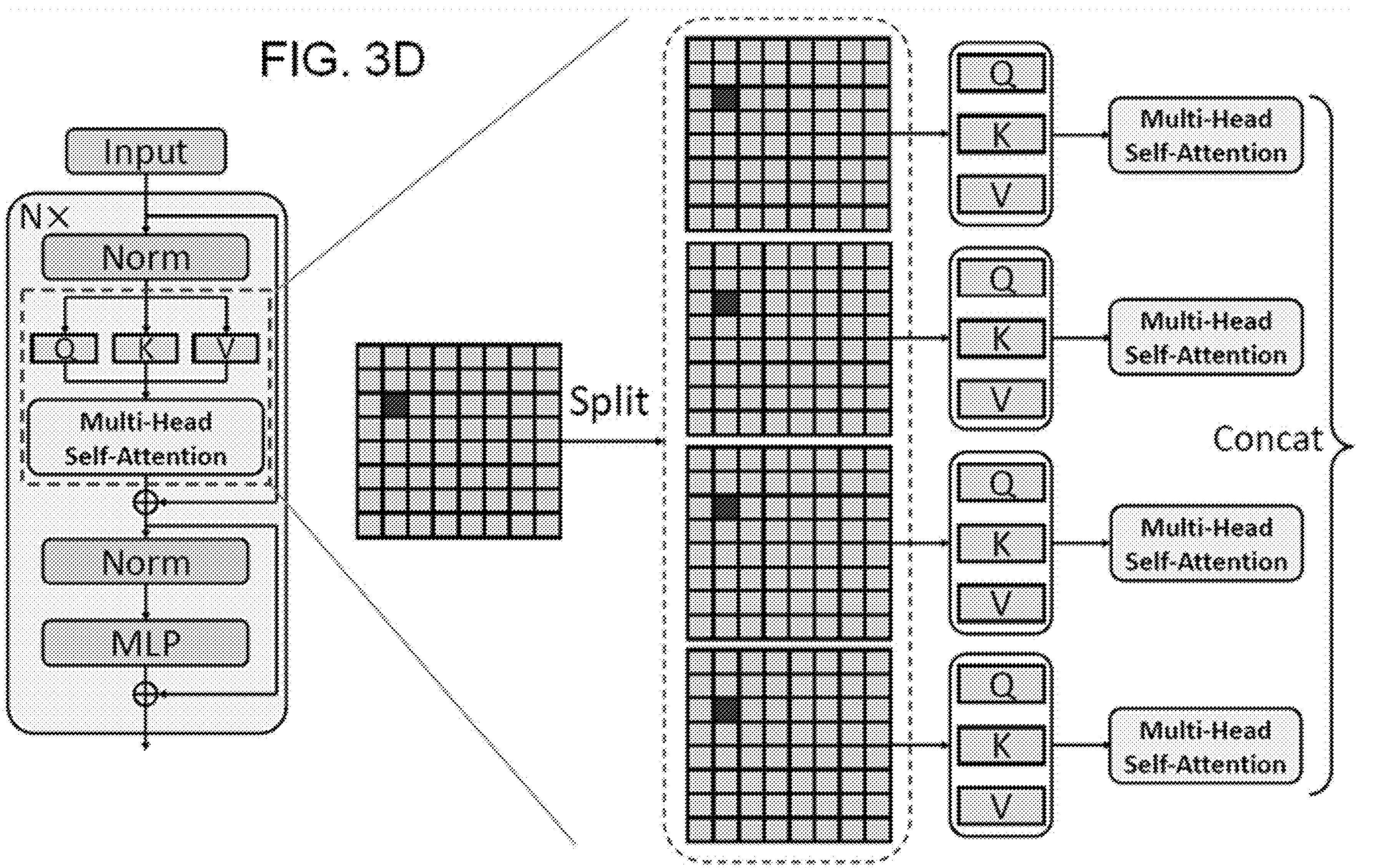
FIG. 3D illustrates examples of multi-receptive fields and/or attention windows in a transformer, according to embodiments.
Figure 4A:
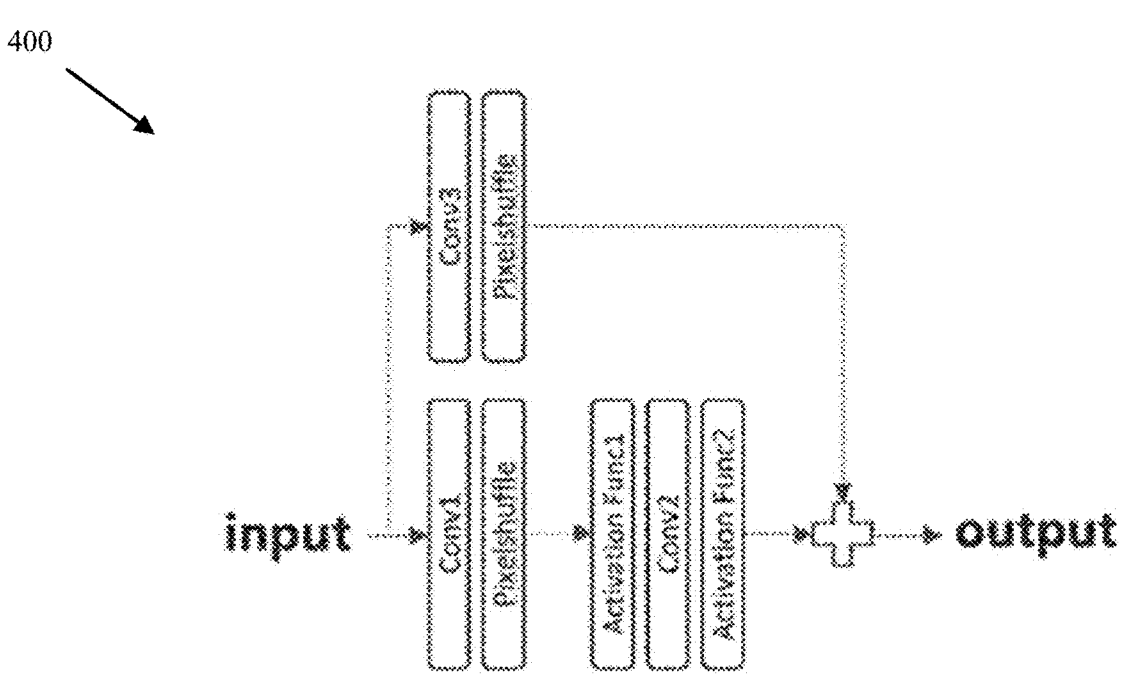
FIG. 4A-4B illustrate exemplary efficient neural network modules for neural image compression.
Figure 4A:
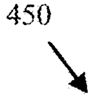
Figure 4B:
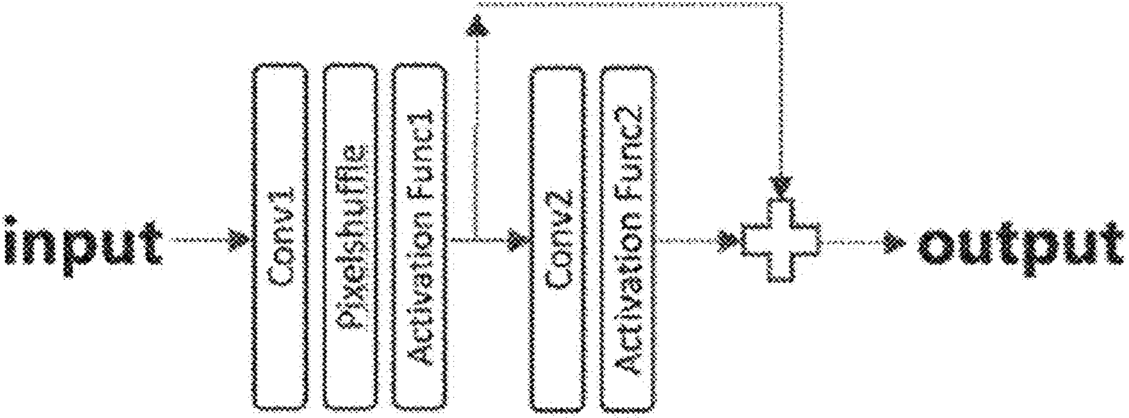
Figure 5:
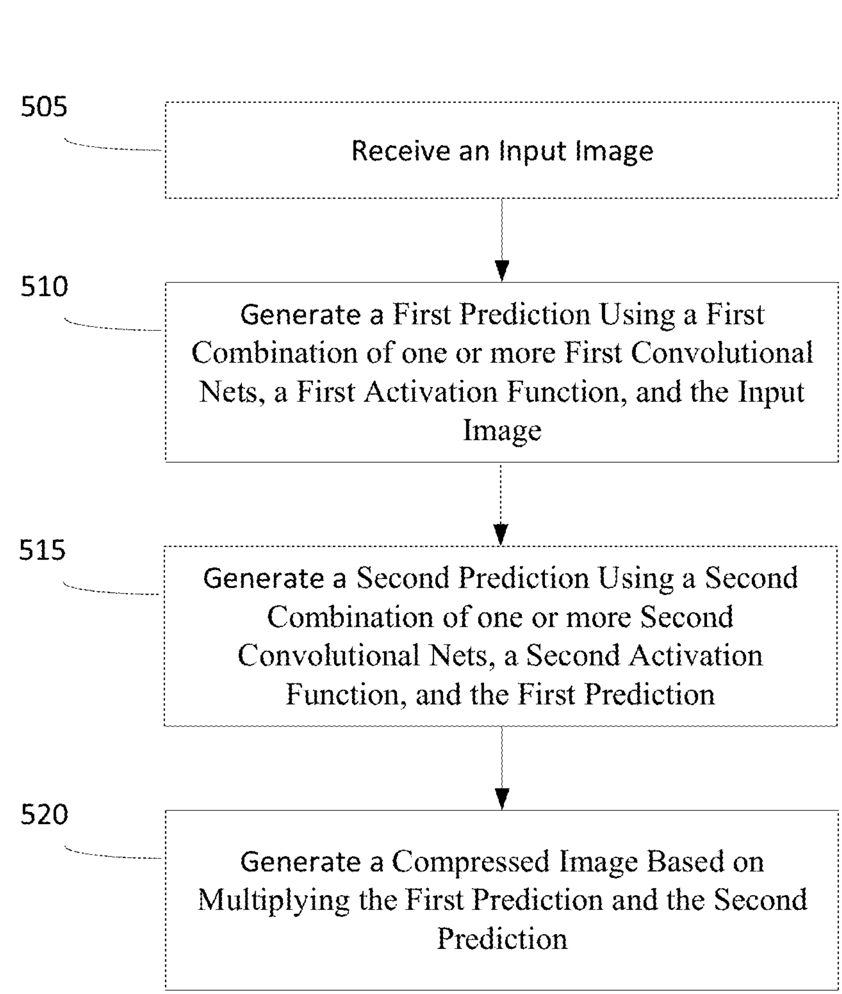
FIG. 5 is a flowchart illustrating a method for neural image compression (NIC) using a neural network, according to embodiments.

In embodiments, any one of the operations or processes of FIGS. 3-5 may be implemented by or using any one of the elements illustrated in FIGS. 1 and 3.

A hybrid image codec in related art is difficult to optimize. An improvement of a single module may not result in an optimal coding gain in overall performance. In contrast, in an artificial neural network-based image coding framework, by performing a machine learning process, different modules can be jointly optimized from input to output to improve a final objective (e.g., rate-distortion performance), resulting in an end-to-end (E2E) optimized Neural Image Compression (NIC).

FIG. 3A is an illustration of an exemplary block diagram 300 of a framework of a variation autoencoder (VAE)-based neural image compression networks, according to embodiments.

As shown in FIG. 3, the NIC framework includes a main encoder 310 (e.g., FIG. 3B), main decoder 320 (e.g., FIG. 3C), hyper encoder 330, hyper decoder 340, a context model 350, an entropy parameter network 355, and a factorized entropy model 390. The VAE-based NIC framework may include one or multiple such modules. The VAE-based NIC framework further includes a quantizer 360/361, an arithmetic coder 370/371, and an arithmetic decoder 380/381. The same or similar modules are represented by the same reference numbers. The NIC framework may include one or more modules not shown in FIG. 3.

The NIC framework may use any DNN-based image compression method, such as scale-hyperprior encoder-decoder framework (or Gaussian Mixture Likelihoods framework) and its variants, RNN-based recursive compression method and its variants.

According to embodiments of the present disclosure, an NIC framework may utilize the block diagram 300 as follows. Given an input image or video sequence x, the main encoder 310 may compute a compressed representation $\hat{x}$ or y that is compact for storage and transmission purposes when compared to the input image x. The compressed representation $\hat{x}$ may be quantized into a discrete-valued quantized representation $\hat{y}$ using quantizer 360. This discrete-valued quantized representation $\hat{y}$ may then be entropy encoded into a bitstream using the arithmetic coder 370 using arithmetic coding (lossless or lossy). On the decoder side, the bitstream may go through lossless or lossy entropy decoding using arithmetic decoder 380 to recover discrete-valued quantized representation $\hat{z}$. This discrete-valued quantized representation $\hat{z}$ may then be input into the main decoder 320 to recover and/or reconstruct the input image or video sequence x. The main encoder 310 and main decoder 320 may be a neural network based encoders and decoders (e.g., DNN based coder).

In some embodiments, previous NIC methods take a variational autoencoder (VAE) structure, where the DNN encoders directly use the entire image x as its input, which is passed through a set of network layers that work like a black box to compute the output representation x. Correspondingly, the DNN decoders take the entire representation $\hat{x}$ as its input, which is passed through another set of network layers that work like another black box to compute the reconstructed $\bar{x}$.

The hyper encoder 330 may encode the compressed representation $\hat{x}$ using a series of convolution layers and Long-range Crossing Attention Modules (LCAM). Then, a hyper compressed representation of the hyper-encoded compressed representation may be generated using the quantizer 361 and the arithmetic coder 371. The arithmetic decoder 381 may decode the hyper compressed representation. Then a hyper reconstructed image x' may be generated using a hyper decoder 340. The neural network based context model 350 may be trained using the hyper reconstructed image and the quantized representation from quantizer 360. The arithmetic coder 370 and arithmetic decoder 380 may use the context model 350 for encoding and decoding, respectively.

VAE-based neural image compression architecture may further incorporates a hyperprior to effectively capture spatial dependencies in the latent representation. The context model, inspired by the concept of context from traditional codecs, may be used to predict the probability of unknown codes based on latents that have already been decoded. The latents may be generated by the main encoder 310 in VAE structure. Hyper latent and context may be used jointly to predict both the location (e.g., mean value) and scale parameter of the entropy model.

A Rate-Distortion (R-D) loss is optimized to achieve trade-off between the distortion loss D $(x, \bar{x})$ of the reconstructed image $\bar{x}$ and the bit consumption R of the compressed representation $\hat{u}$ with a trade-off hyperparameter $\lambda$ using the following target loss function L:

$$L(x, \bar{x}, \hat{x}) = \lambda D(x, \bar{x}) + R(\hat{x}) \quad \text{Equation (1)}$$

An embodiment of the proposed long-range context model predicts a latent by focusing on the long-range global area and covering the whole latent features more effectively. Unlike autoregressive-based context mode (and its variants) and parallel-based context model (and its variants), known convolutional layer-based methods only examine the local limited receptive field (constrain by kernel size, such as 3×3, 5×5) when decoding the current latents, embodiments disclosed herein focuses on the long-range global area (can learn the dependency among entire latent and does not constrain by the kernel size), which covers the whole latent features more effectively.

An exemplary legend for FIG. 3A may be seen in Table 1 below.

TABLE 1

Exemplary Legend for FIG. 3

| Component | Symbol |
|---|---|
| Input Image | $x$ |
| Encoder | $g_a(\cdot)$ |
| Latents | $y = g_a(x)$ |
| Quantized Latents | $\hat{y} = Q(y)$ |
| Decoder | $g_s(\cdot)$ |
| Hyper Encoder | $h_a(\cdot)$ |
| Hyper-latents | $z = h_a(y)$ |
| Quantized Hyper-latents | $\hat{z} = Q(z)$ |
| Hyper Decoder | $h_s(\cdot)$ |
| Context Parameters | $\psi = h_s(\hat{z})$ |
| Causal Context | $\hat{y}_{<i}$ |
| Context Features | $\phi = g_{cm}(\hat{y}_{<i}, \psi)$ |
| Entropy Parameter Network | $g_{cp}(\cdot)$ |
| Mean, Scale | $\mu, \sigma = g_{cp}(\psi, \phi)$ |
| Reconstruction Image | $\hat{x} = g_s(\hat{y})$ |

FIGS. 3B-C illustrate examples of detailed structure of encoder/decoder. LCAM referred to in FIGS. 3B-C refers to Long-range Crossing Attention Module, which is shown in greater detail in FIG. 3D.

The present disclosure relate to an efficient neural network module with downsample/upsample in the encoder/decoder. Embodiments disclose modules that may replace the highlighted downsample/upsample convolutional layers/nets and the LCAM.

FIG. 3D illustrates examples an LCAM including multi-receptive fields and/or attention windows in vision transformers. As shown in FIG. 3D, in an embodiment, is to channel-wise split the input feature maps into n pieces. In embodiments, such feature maps may be acquired from transforming an image by using a neural network. For each piece of the feature map, different shapes of receptive fields to provide more flexibility. As an example, a feature may be split into 4 pieces. For each piece of the feature map, the receptive fields are different (shaded regions in FIG. 3D).

FIG. 4A illustrates an exemplary diagram 400 of an efficient module. An embodiment of the present disclosure relates to an efficient tensor transform with downsample in encoders and tensor transform with upsample in decoders. In an embodiment, convolutional net (e.g., conv1, conv 2) may have 3×3 filter size; in a same or other embodiment, convolutional net (e.g., conv1, conv2) has 5×5 filter size; in a same or other embodiment, convolutional net (e.g., conv1, conv2) has 7×7 filter size. In the architecture as shown in diagram 400, Conv1, Conv2 and Conv3 may not be exactly same. For example, one can be a 3×3 conv, while other two can be 5×5 convs.

In an embodiment, the activation function may be Relu, while in a same or other embodiment, the activation function may be leakyRelu. In a same or other embodiment, the activation function is iGDN. In an example architecture, activation functions may not be exactly same. For example, activation function1 could be Relu, while activation function2 could be iGDN. In an embodiment, Pixelshuffle may control upsample/downsample in the encoder/decoder.

FIG. 4B illustrates an exemplary diagram 450 of an efficient module. An embodiment of the present disclosure relates to an efficient tensor transform with downsample in encoders and tensor transform with upsample in decoders. In an embodiment, convolutional net (e.g., conv1, conv 2) may have 3×3 filter size; in a same or other embodiment, convolutional net (e.g., conv1, conv2) has 5×5 filter size; in a same or other embodiment, convolutional net (e.g., conv1, conv2) has 7×7 filter size. In the architecture as shown in diagram 450, Conv1, Conv2 and Conv3 may not be exactly same. For example, one can be a 3×3 conv, while other two can be 5×5 convs.

In an embodiment, the activation function may be Relu, while in a same or other embodiment, the activation function may be leakyRelu. In a same or other embodiment, the activation function is iGDN. In an example architecture, activation functions may not be exactly same. For example, activation function1 could be Relu, while activation function2 could be iGDN. In an embodiment, Pixelshuffle may control upsample/downsample in the encoder/decoder.

FIG. 5 is an exemplary flowchart illustrating process 500 for neural image compression using a neural network.

At operation 505, an input image may be received, the image may be split into a plurality of pieces or blocks.

At operation 510, a first prediction may be generated using a first combination of one or more first convolutional nets, a first activation function, and the input image. In some embodiments, generating the first prediction further comprises sub-pixel convolutions.

At operation 515, a second prediction may be generated using a second combination of one or more second convolutional nets, a second activation function, and the first prediction.

In some embodiments, the first activation function and the second activation function are different activation functions. In some embodiments, the first activation function and the second activation function have different architectures.

At operation 520, the first prediction and the second prediction may be multiplied to generate a compressed image.

In some embodiments, a third prediction may be generated using third combination of one or more third convolutional nets, third activation function, and the input image and the second prediction and the third prediction may be multiplied to generate the compressed input image.

In some embodiments, the first prediction and the third prediction are generated in parallel. In some embodiments, the one or more first convolutional nets, the one or more second convolutional nets, and the one or more third convolutional nets have different filter sizes.

Figure 6:
FIG. 6 is a flowchart illustrating a method for decoding a compressed image using neural image compression (NIC) using a neural network, according to embodiments.
Figure 6:
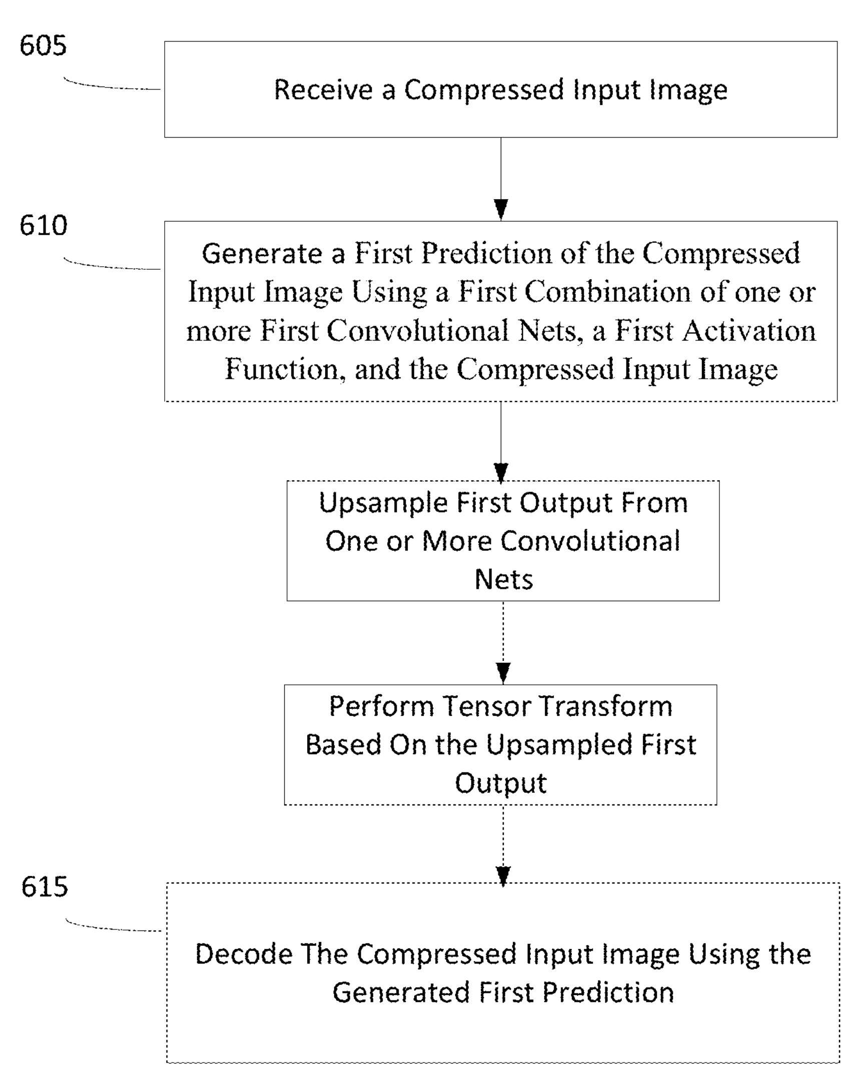

FIG. 6 is an exemplary flowchart for a process 600 illustrating a method for decoding a compressed image using neural image compression (NIC) using a neural network, according to embodiments.

At operation 605, a compressed input image may be received.

At operation 610, a first prediction of the compressed input image may be generated using a first combination of one or more first convolutional nets, a first activation function, and the compressed input image In an embodiment, operation 610 may include upsampling a first output from the one or more first convolutional nets. In an embodiment, operation 610 may also include performing tensor transform based on the upsampled first output.

At operation 615, the compressed input image may be decoded using the generated first prediction.

In some embodiments, process 600 may also include generating a second prediction using a second combination of one or more second convolutional nets, a second activation function, and the first prediction. The generation of the second prediction may include upsampling a second output from the one or more second convolutional nets; and performing tensor transform based on the upsampled second output.

In the same or other embodiment, the decoding may include multiplying the first prediction and the second prediction to generate an intermediate compressed image; and then decoding the intermediate compressed image.

In some embodiments, process 600 may also further include generating a third prediction using third combination of one or more third convolutional nets, third activation function, and the compressed input image. The generating of the third prediction may include upsampling a third output from the one or more third convolutional nets; and performing tensor transform based on the upsampled third output.

In the same or another embodiment, the decoding may include multiplying the second prediction and the third prediction to generate a second intermediate compressed image; and decoding the second intermediate compressed image.

Figure 7:
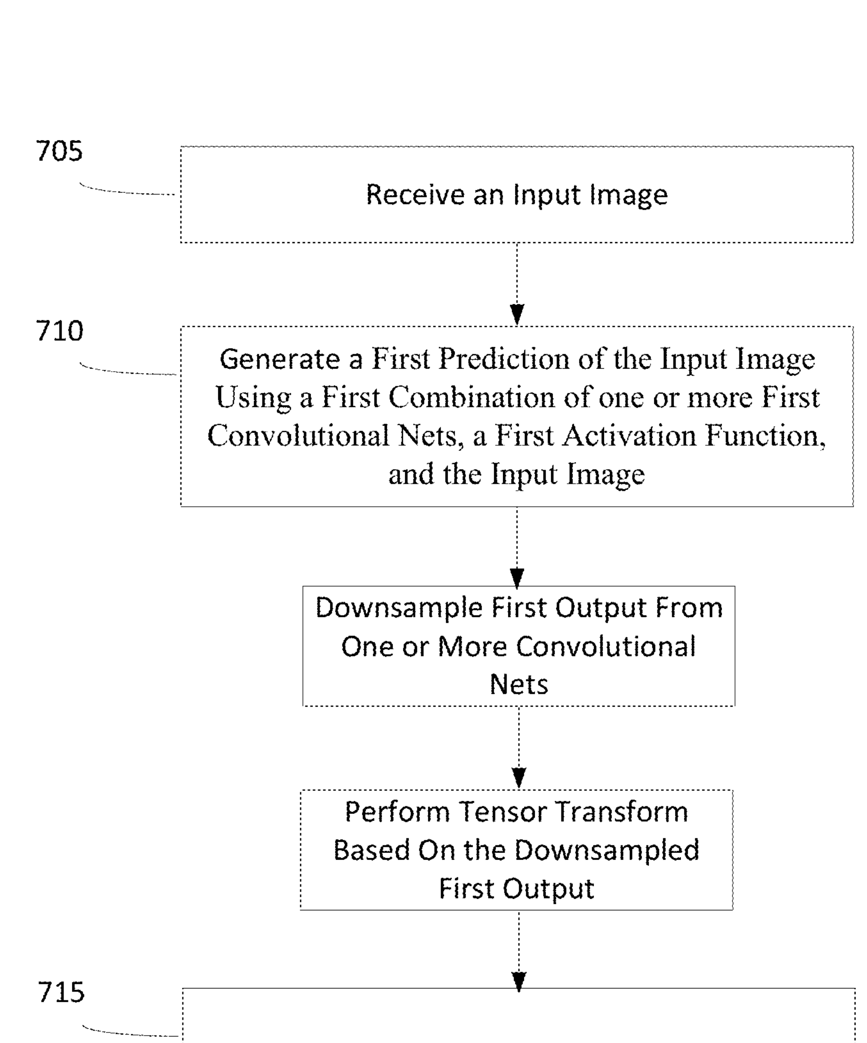
FIG. 7 is a flowchart illustrating a method for encoding an input image using neural image compression (NIC) using a neural network, according to embodiments.

FIG. 7 is a, exemplary flowchart for a process 700 illustrating a method for encoding an input image using neural image compression (NIC) using a neural network, according to embodiments.

At operation 705, an input image may be received.

At operation 710, a first prediction of the compressed input image may be generated using a first combination of one or more first convolutional nets, a first activation function, and the input image In an embodiment, operation 710 may include downsampling a first output from the one or more first convolutional nets. In an embodiment, operation 710 may also include performing tensor transform based on the downsampled first output.

At operation 715, the input image may be encoded using the generated first prediction.

In some embodiments, process 700 may also include generating a second prediction using a second combination of one or more second convolutional nets, a second activation function, and the first prediction. The generation of the second prediction may include downsampling a second output from the one or more second convolutional nets; and performing tensor transform based on the downsampled second output.

In the same or other embodiment, the encoding may include multiplying the first prediction and the second prediction to generate an intermediate compressed image; and then encoding the intermediate compressed image.

In some embodiments, process 700 may also further include generating a third prediction using third combination of one or more third convolutional nets, third activation function, and the input image. The generating of the third prediction may include downsampling a third output from the one or more third convolutional nets; and performing tensor transform based on the downsampled third output.

In the same or another embodiment, the encoding may include multiplying the second prediction and the third prediction to generate a second intermediate compressed image; and then encoding the second intermediate compressed image.

It is known that the above-mentioned processes 500, 600, and 700 may be modified by a person skilled in the art using a neural image compression network.

The techniques described above, can be implemented as computer software using computer-readable instructions and physically stored in one or more computer-readable media or by a specifically configured one or more hardware processors. For example, FIG. 1 shows an environment 100 suitable for implementing various embodiments. In one example, the one or more processors execute a program that is stored in a non-transitory computer-readable medium.

As used herein, the term component is intended to be broadly construed as hardware, software, or a combination of hardware and software.

It will be apparent that systems and/or methods, described herein, may be implemented in different forms of hardware, software, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for decoding using neural network based image compression, the method being executed by at least one processor, the method comprising:

receiving a compressed input image;

generating a first prediction of the compressed input image using a first combination of one or more first convolutional nets, a first activation function, and the compressed input image, the generating the first prediction comprises:

upsampling a first output from the one or more first convolutional nets; and performing tensor transform based on the upsampled first output;

generating a second prediction using a second combination of one or more second convolutional nets, a second activation function, and the first prediction, wherein generating the second prediction comprises:

upsampling a second output from the one or more second convolutional nets; and performing tensor transform based on the upsampled second output; and decoding the compressed input image using the first prediction and the second prediction.

2. The method of claim 1, wherein the decoding comprises:

multiplying the first prediction and the second prediction to generate an intermediate compressed image; and decoding the intermediate compressed image.

3. The method of claim 1, wherein the method further comprises:

generating a third prediction using third combination of one or more third convolutional nets, third activation function, and the compressed input image, wherein generating the third prediction comprises:

upsampling a third output from the one or more third convolutional nets; and performing tensor transform based on the upsampled third output; and wherein the decoding comprises:

multiplying the second prediction and the third prediction to generate a second intermediate compressed image; and decoding the second intermediate compressed image.

4. The method of claim 3, wherein the first prediction and the third prediction are generated in parallel.

5. The method of claim 2, wherein the first activation function and the second activation function are different activation functions.

6. The method of claim 2, wherein the first activation function and the second activation function have different architectures.

7. The method of claim 3, wherein the one or more first convolutional nets, the one or more second convolutional nets, and the one or more third convolutional nets have different filter sizes.

8. An apparatus for decoding neural network based image compression, the apparatus comprising:

at least one memory configured to store computer program code; and at least one processor configured to read the computer program code and operate as instructed by the computer program code, the computer program code including:

receiving code configured to cause the at least one processor to receive a compressed input image;

first generating code configured to cause the at least one processor to generate a first prediction of the compressed input image using a first combination of one or more first convolutional nets, a first activation function, and the compressed input image, the first generating code comprises:

first upsampling code configured to cause the at least one processor to upsample a first output from the one or more first convolutional nets; and first tensor transform code configured to cause the at least one processor to perform tensor transform based on the upsampled first output;

second generating code configured to cause the at least one processor to generate a second prediction using a second combination of one or more second convolutional nets, a second activation function, and the first prediction, wherein second generating code comprises:

second upsampling code configured to cause the at least one processor to upsample a second output from the one or more second convolutional nets; and second tensor transform code configured to cause the at least one processor to perform tensor transform based on the upsampled second output; and first decoding code configured to cause the at least one processor to decode the compressed input image using the first prediction and the second prediction.

9. The apparatus of claim 8, wherein the first decoding code comprises:

first multiplying code configured to cause the at least one processor to multiply the first prediction and the second prediction to generate an intermediate compressed image; and second decoding code configured to cause the at least one processor to decode the intermediate compressed image.

10. The apparatus of claim 8, wherein the program code further include:

third generating code configured to cause the at least one processor to generate a third prediction using third combination of one or more third convolutional nets, third activation function, and the compressed input image, wherein the third generating code comprises:

third upsampling code configured to cause the at least one processor to upsample a third output from the one or more third convolutional nets; and third tensor transform code configured to cause the at least one processor to perform tensor transform based on the upsampled third output; and wherein the first decoding code comprises:

second multiplying code configured to cause the at least one processor to multiply the second prediction and the third prediction to generate a second intermediate compressed image; and second decoding code configured to cause the at least one processor to decode the second intermediate compressed image.

11. The apparatus of claim 10, wherein the first prediction and the third prediction are generated in parallel.

12. The apparatus of claim 9, wherein the first activation function and the second activation function are different activation functions.

13. The apparatus of claim 9, wherein the first activation function and the second activation function have different architectures.

14. The apparatus of claim 10, wherein the one or more first convolutional nets, the one or more second convolutional nets, and the one or more third convolutional nets have different filter sizes.

15. A non-transitory computer-readable medium storing instructions that, when executed by at least one processor of an apparatus for neural network based image compression, cause the at least one processor to perform a method according to claim 1.

16. A method for encoding using neural network based image compression, the method being executed by at least one processor, the method comprising:

receiving an input image;

generating a first prediction of the input using a first combination of one or more first convolutional nets, a first activation function, and the input image, the generating the first prediction comprises:

downsampling a first output from the one or more first convolutional nets; and performing tensor transform based on the downsampled first output;

generating a second prediction using a second combination of one or more second convolutional nets, a second activation function, and the first prediction, wherein generating the second prediction comprises:

downsampling a second output from the one or more second convolutional nets; and performing tensor transform based on the downsampled second output; and encoding the input image using the first prediction and the second prediction.

17. The method according to claim 16, wherein the encoding comprises:

multiplying the first prediction and the second prediction to generate an intermediate compressed image; and encoding the intermediate compressed image.

18. The method according to claim 16, wherein the method further comprises:

generating a third prediction using third combination of one or more third convolutional nets, third activation function, and the input image, wherein generating the third prediction comprises:

downsampling a third output from the one or more third convolutional nets; and performing tensor transform based on the downsampled third output; and wherein the encoding comprises:

multiplying the second prediction and the third prediction to generate a second intermediate compressed image; and decoding the second intermediate compressed image.

19. The method of claim 18, wherein the first prediction and the third prediction are generated in parallel.

20. The method of claim 18, wherein the first activation function, the second activation function, and the third activation function are different activation functions.

* * * * *